April 21, 1925.
B. HASKELL
BRAKE BEAM SUPPORT
Filed Feb. 28, 1924
1,534,587
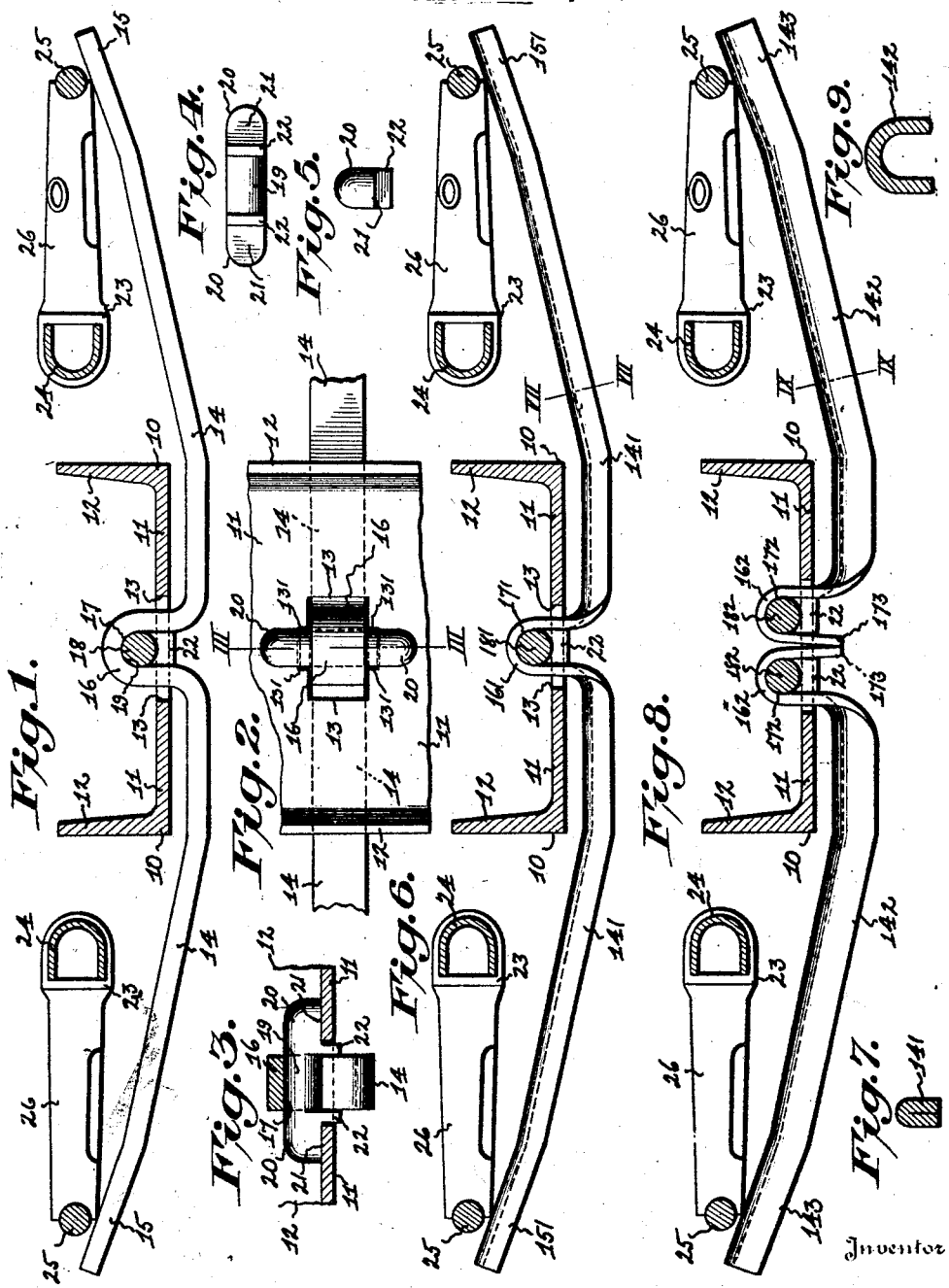
WITNESS:—
Chas. L. Griesbauer
Inventor
Broderick Haskell,
W. Schornborn,
Attorney

Patented Apr. 21, 1925.

1,534,587

UNITED STATES PATENT OFFICE.

BRODERICK HASKELL, OF FRANKLIN, PENNSYLVANIA, ASSIGNOR TO DAVIS BRAKE BEAM COMPANY, OF JOHNSTOWN, PENNSYLVANIA, A CORPORATION OF PENNSYLVANIA.

BRAKE-BEAM SUPPORT.

Application filed February 28, 1924. Serial No. 695,795.

*To all whom it may concern:*

Be it known that I, BRODERICK HASKELL, a citizen of the United States, residing at Franklin, in the county of Venango and State of Pennsylvania, have invented new and useful Improvements in Brake-Beam Supports, of which the following is a specification.

This invention relates to means for supporting the brake beams of railway trucks, and more particularly to the type of support known as the third and fourth point suspension in which there is employed, in addition to the usual hangers at the opposite ends of the brake beam, one or more supports for a portion of the brake beam, for the purpose of maintaining the brake beam substantially level and parallel in its various positions in either direction of rotation of the wheels and under different conditions of service and wear of the brake shoes and wheels.

The objects of the invention are:—

First, to provide a brake beam support of the character above indicated which will be simple in character and consists of a minimum number of parts, readily inspected, easily applied or removed, taken apart or repaired, and which requires no disturbing or dismantling of the other elements comprising the braking apparatus of the railway truck, or skilled labor to install the same or tedious adjustments to keep the brake mechanism in efficient and constant operation.

Second, to provide a support consisting of an arm so supported intermediate its ends as to be capable of being rocked or tilted by the rise of one brake beam and the fall of its mate which action takes place simultaneously when the brakes are applied to the oppositely rotating inner portions of the truck wheels.

Third, other objects and advantages of the invention will appear from the detailed construction and combination of the parts, manner of assembling the same and mode of operation to be hereinafter more fully described.

In the drawings, in which similar reference characters indicate the same parts in the several figures:

Figure 1 is a fragmentary side elevation partly in section of a truck showing the invention applied thereto.

Figure 2 is a fragmentary top plan view of the middle section of Figure 1.

Figure 3 is a section on line III—III of Figure 2.

Figure 4 is a bottom plan view of a pin for detachably connecting the brake beam support bar to the spring plank.

Figure 5 is an end view of the pin shown on Figure 4.

Figure 6 is a side elevation partly in section similar to Figure 1 of a modified form of the invention.

Figure 7 is a section on line VII—VII of Figure 6.

Figure 8 is a side elevation similar to Figures 1 and 6 of a further modification of the improved support, and Figure 9 is a section on line IX—IX of Figure 8.

Referring to Figures 1, 2, 3 and 4, 10 is the usual spring plank which in this invention is formed of a channel iron having the web 11, and flanges 12, 12 as shown. The web 11 of the spring plank 10 is provided with an opening 13, for the reception of a part or element of the means employed for suspending the supporting arm 14 from the spring plank, as for example, a loop 16 formed by suitably bending a portion of the arm intermediate its ends. This loop is so proportioned that when the arm is in proper position relative to the spring plank, a portion of the loop will project sufficiently far through the opening in the plank to permit of the insertion of a supporting pin 18 of sufficient length to bear on the web 11 on opposite sides of the loop. In the specific embodiment of the invention shown herein the opening 13 in the web is made rectangular and of sufficient length to permit of the rocking of the arm 14 on the supporting pin 18 which is adapted to serve as a fulcrum on which the arm can rock and also hold the loop in proper position in the opening 13.

As shown in Figs. 2, 3 and 4, the pin 18 is preferably formed with a central cylindrical bearing surface 19 between ends 20 which have flat bottom surfaces 21 adapted to bear on the upper surfaces of the web 11. The pin is also provided with projections 22 adapted to extend into notches 131 in opposite edges of the opening 13 and prevent the pin from moving longitudinally from the loop and to prevent the loop from being shifted from its central position in the opening 13. The proper manner of inserting the pin 18 to the position shown in Figs. 1 and 2 for supporting the arm 14 is to elevate the arm so that the loop 16 will project through the opening 13 to permit of the insertion of the pin through the loop. After the pin has been placed in position with its projections 22 extending into the notches 131, the arm is lowered so that the bearing portion 17 of the loop rests on the cylindrical portion 19 of the pin as clearly shown in Figs. 1 and 2. By this arrangement and construction of the pin 18, said pin is held or locked in position in said notches 131, 131 by the weight of the brake beams on the arm 14, and said arm 14 is properly held in alinement with respect to the spring plank 10 and its opening 13, so that said arm 14 will freely oscillate, rock or tilt on the cylindrical bearing surface 19 of the pin 18. By means of the relative arrangement of the supporting arm and the brake beams, the latter will counterbalance one another.

From the foregoing described construction and manner of applying the pin 18, it will be evident that by reversing the operations above explained the pin 18 can be easily and quickly withdrawn from its operative position, with respect to the loop 16 and opening 13 and the arm 14 detached from the spring plank 10.

Said brake beams 23 are provided with the usual compression member 24 and tension member 25 connected by a strut 26, as is common in this class of brake mechanism and needs no further disclosure.

Referring to Figures 6 and 7, substantially the same construction is shown as disclosed in Figures 1 to 5 inclusive, except the brake beam supporting arm 141 instead of being formed of a flat resilient bar, as shown in Figures 1 and 3, consists of a flattened channel iron, as shown in section in Figure 7, except the loop portion 161 having the bearing or seat 171 and which passes through the opening 13 in the web 11 of the spring plank 10, is made rectangular in cross section, similar to that shown in Figures 1 and 3. The flattening of the loop portion of the arm will permit of the flexure of the sides or legs of the loop when loads are placed on the arms.

Figures 8 and 9 show a further modification of the invention, in which the supporting arm is divided into two similar and oppositely disposed members or sections 142, 142 having their inner ends each bent having one leg or side 173 free and adapted to extend up and through the opening 13 in the web 11 of the spring plank 10 and a fulcrum pin 182 is inserted through each loop. The opening through the web of the spring plank is made sufficiently long to permit of the insertion of the loops on the two sections of the arm. These loops are engaged by pins 1 and 2 similar in construction to the pin 18, and the notches 131 in the side walls of the opening into which the locking lugs project, are so located that the pins will hold the free legs 173 of the loops in contact as shown in Fig. 8, so that the rocking movement of one section 142 on its fulcrum pin 182 is conveyed to the other section. As the inner or looped ends of the sections are flattened and the outer portions and ends 143, 143 are U-shape in cross section, as indicated in Figure 9, and hence stiffer than said inner ends, the divided or composite brake beam supporting means consisting of two members or sections 142, 142, will be elastic and yielding to take up any slack, and at the same time provide for the counterbalancing of one brake beam by the other.

The main distinguishing characteristic of the invention described herein is the suspension or support of the brake beam supporting arm by means of a part or element passing through an opening in the spring plank and engaging a portion of the supporting arm at a point intermediate its ends and the broad terms of the claims herein should not be construed as limited to any specific construction or embodiment of the invention described herein.

What I claim is:—

1. The combination of a spring plank having an opening therethrough, a rocking brake beam supporting arm arranged below said plank and its ends extending beyond the sides of said spring plank and having a portion between its ends projecting upwardly through said opening in said spring plank, and means above the plank engaging the portion of the arm projecting through the opening and forming a pivotal support for the arm.

2. The combination of a spring plank having an opening therethrough, a yielding rocking brake beam supporting arm arranged below the plank and its ends extending beyond the sides of said spring plank and having a portion between its ends passing up through said opening in the spring plank, and means above the plank engaging the portion of the arm extending through said opening and forming a pivotal support for said arm.

3. The combination of a spring plank having an opening therethrough, a rocking brake beam supporting arm arranged below said plank and its ends extending beyond the sides of said spring plank and having a section of its middle portion passing into and projecting through said opening, and means engaging the portion of said arm projecting through said opening for pivotally supporting said arm on said spring plank.

4. The combination of a spring plank having an opening therethrough, a yielding rocking brake beam supporting arm arranged below said plank and its ends extending beyond the sides of said spring plank and having a section of its middle portion passing into and projecting through said opening, and means engaging the portion of said arm projecting through said opening for pivotally supporting said arm on said spring plank.

5. The combination of a spring plank having an opening therethrough, a brake beam supporting arm arranged below said plank and its ends extending beyond the sides of said spring plank and having a portion passing into and projecting through said opening, and means cooperating with said spring plank and engaging the portion of said arm projecting thru said opening for supporting said arm on said spring plank.

6. The combination of a spring plank having an opening therethrough a brake beam supporting arm arranged below said plank and its ends extending beyond the sides of said spring plank and having its middle portion passing into and projecting through said opening, and means detachably resting on the upper surface of said spring plank and engaging the portion of said arm projecting through said opening for supporting said arm on said spring plank.

7. The combination of a spring plank having an opening therethrough, a rocking brake beam supporting arm arranged below said plank and its end extending beyond the sides of said spring plank and having its middle portion looped and freely passing into and projecting through said opening, and a fulcrum pin engaging the portion of the loop of said arm projecting through said opening and resting on said spring plank and forming a pivotal support for said arm on said spring plank.

8. The combination of a spring plank having an opening therethrough, a rocking brake beam supporting arm arranged below said plank and its ends extending beyond the sides of said spring plank and having its middle portion freely passing into and projecting through said opening, and means resting on said spring plank and engaging the portion of said arm projecting through said opening for pivotally supporting said bar on said spring plank.

9. The combination of a spring plank having an opening therethrough, a rocking brake beam supporting arm arranged below such plank and its ends extending beyond the sides of said spring plank and having its middle portion freely passing into and projecting through said opening and means detachably resting on said spring plank and engaging the portion of said bar projecting through said opening for pivotally and removably supporting said arm on said spring plank.

10. The combination of a spring plank formed from a channel iron having an opening through its web, a rocking brake beam supporting arm arranged below said plank and its ends extending beyond the sides of said spring plank and having its middle portion freely passing into and projecting through said opening, and a fulcrum pin engaging the portion of said arm projecting through said opening and seated on and locked in position on said web opening for pivotally supporting said bar on said spring plank.

11. The combination of a spring plank formed from a channel iron having an opening through its web, a rocking brake beam supporting arm arranged below said web and its ends extending beyond the sides of said spring plank and having its middle portion freely passing into and projecting through said opening, and a detchable fulcrum pin engaging the portion of said arm projecting through said opening and locked in position on said web for pivotally supporting said arm on said spring plank.

12. The combination of a spring plank having an opening therethrough, a rocking brake beam supporting arm arranged below said plank and its ends extending beyond the sides of said spring plank and having a yielding portion between its ends passing into and projecting through said opening in the spring plank, and means for engaging the projecting portion of said arm for pivotally supporting said arm on said spring plank.

13. The combination of a spring plank having an opening in its lower section, a rocking brake beam supporting arm arranged below said lower section and its ends extending beyond the sides of said spring plank and having a resilient portion between its ends passing into and projecting through said opening in the spring plank, and means engaging the projecting portion of said arm for pivotally supporting said arm on said supporting plank.

14. The combination of a spring plank having an opening therethrough, a brake beam supporting arm arranged transversely of the plank and having its ends extending beyond the sides of the plank and means bearing on the plank and extending through the opening and engaging the supporting arm.

15. The combination of a spring plank having an opening therethrough, a brake beam supporting arm arranged below the plank and having its ends extending beyond the sides thereof and provided with a loop projecting up through the opening in the plank and a pin passing through the portion of the loop above the plank and bearing on the plank.

16. The combination of a spring plank having an opening therethrough, a brake beam supporting arm arranged below the plank and having its ends extending beyond the sides thereof and provided with a loop having resilient legs, said loop projecting up through the opening in the plank and a pin passing through the portion of the loop above the plank and bearing on the plank.

17. The combination of a spring plank having an opening therethrough, a brake beam supporting arm arranged below the plank and having its ends extending beyond the sides thereof and provided with a loop projecting up through the opening in the plank and means for engaging the portion of the loop above the plank, and a pin passing through the portion of the loop above the plank and bearing on the plank.

In testimony whereof I hereunto affix my signature.

BRODERICK HASKELL.